Aug. 4, 1925.
M. LOMBARDI
1,548,091
AIR VALVE FOR RADIATORS OF HEAT
Original Filed Jan. 29, 1924
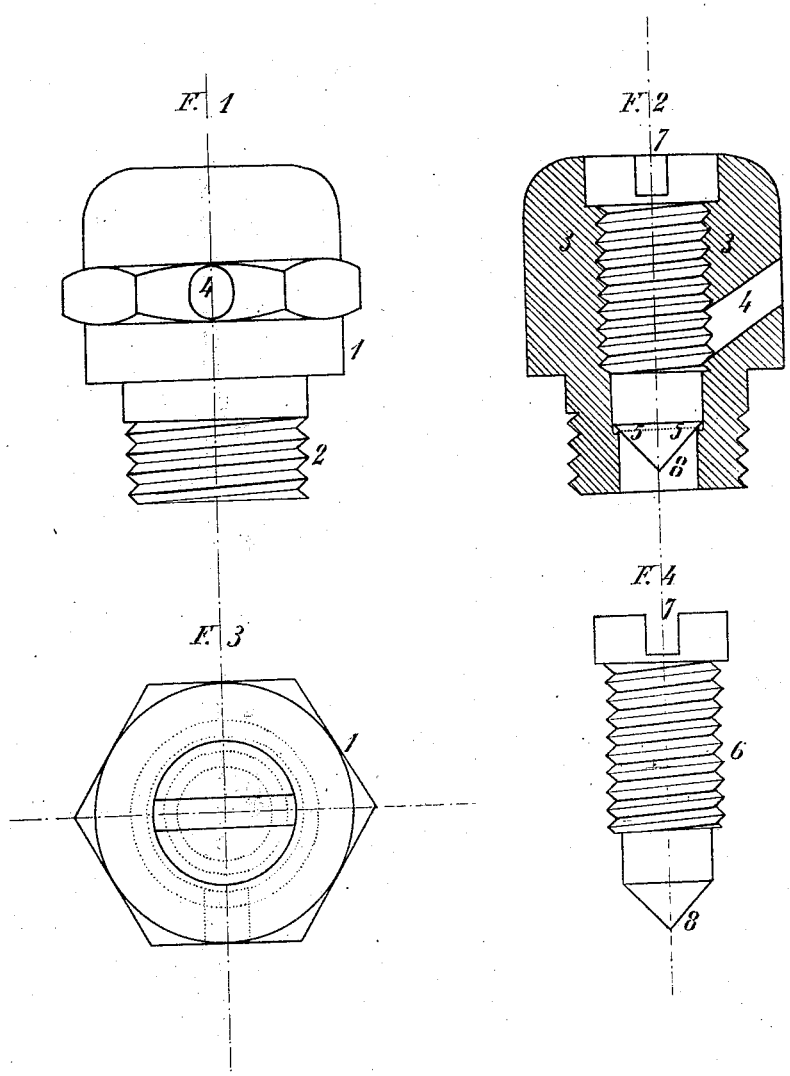

Patented Aug. 4, 1925.

1,548,091

UNITED STATES PATENT OFFICE.

MARIO LOMBARDI, OF NAPLES, ITALY.

AIR VALVE FOR RADIATORS OF HEAT.

Application filed January 29, 1924, Serial No. 689,351. Renewed June 9, 1925.

*To all whom it may concern:*

Be it known that I, MARIO LOMBARDI, a citizen of the Kingdom of Italy, residing at Naples, Italy, do hereby declare that I am in possession of an invention the title of which is Improvements in Air Valves for Radiators of Heat, of which the following is a specification.

This invention relates to valves for radiators of heat in the hot water or steam heating installations, and has for its object to supply a simple valve made of two pieces only.

The valve is illustrated in the accompanying drawing, in which Fig. 1 is a side view of the improved valve.

Fig. 2 is a vertical longitudinal section of the same.

Fig. 3 is a top plan view.

Fig. 4 is a side view of the screw threaded part of the valve.

It may be seen from the drawing that the valve consists of two parts only, a body 1 and a threaded stem 6.

The body 1 of the valve has an intermediate portion cylindrical in shape and with a hexagonal part 10, an outer portion flat at its end and rounded at its side and an external threaded lower end 2 by which it is screwed into the threaded socket of the radiator. Said body 1 is hollow and threaded inside for receiving the threaded stem or screw valve 6. A channel 4 inclined with respect to the axis of the body 1 is pierced through the body's wall, and puts in communication the inner hole 3 and the outer air.

The screw valve 6 is made with a cut 7 on its head and with a conical point 8 at the other end.

When the screw valve is screwed in its seat 5 in the body 1, and this body is screwed in the radiator, the said valve 6 is unscrewed for a few turns and it will then allow the air contained in the radiator and in the conduit to pass between the seat 5—5 and the conical point 8 escaping through channel 4 into the open air. As soon as all the air contained in the radiator and the conduit will have escaped, hot air or steam will come out from the channel 4, when the screw valve 6 will be screwed in again and forced a little on its seat 5—5.

Having so specified the nature of my invention and how it must be performed in order to obtain the desired effect, I now declare that what I claim is:

An air release valve for radiators consisting of two parts only, one part being a body and the other a threaded stem, said body being of tubular construction and having external threads at one end portion adapted to be screwed into a radiator, the bore of said body being provided near its lower end with an annular shoulder and above this shoulder having a smooth cylindrical surface, internal threads being provided within the bore and extending upwardly from the smooth cylindrical portion to a point adjacent the upper end of the body, a port extending through the body from its external surface to the threaded portion of the bore, and said threaded stem being arranged in the bore and having a conical lower end adapted to seat on said shoulder and also having a smooth cylindrical portion arranged above its lower end and normally arranged within the smooth cylindrical portion of the bore, said stem having a head normally lying within the bore and provided with a means adapted to engage a tool for actuating the threaded stem, the portion of the stem lying between its head and its cylindrical portion being threaded and these threads engaging the threads of the bore and closing the port when the stem is in normal position.

In testimony whereof I have signed my name to this specification.

ING. MARIO LOMBARDI.